Feb. 1, 1944.   G. OTT   2,340,424
AUTOMATIC SAFETY VACUUM LOCK
Filed Feb. 16, 1942   3 Sheets-Sheet 3
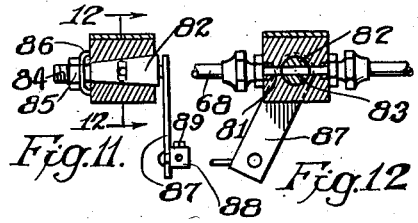
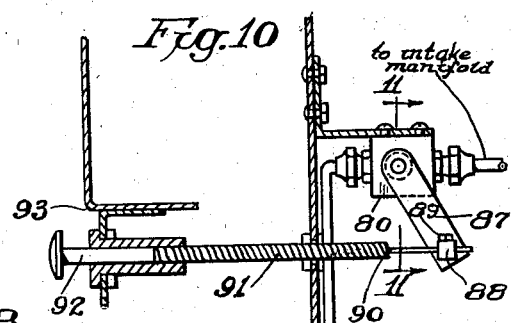
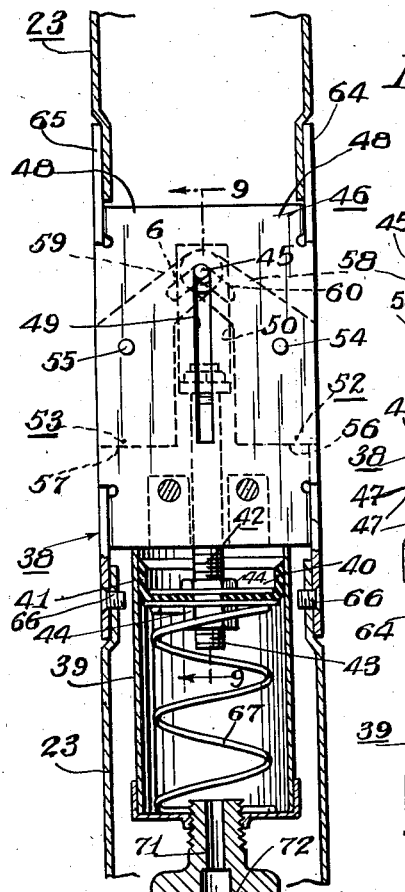
INVENTOR.
George Ott
BY Leonard L. Kalish
Attorney Patented Feb. 1, 1944

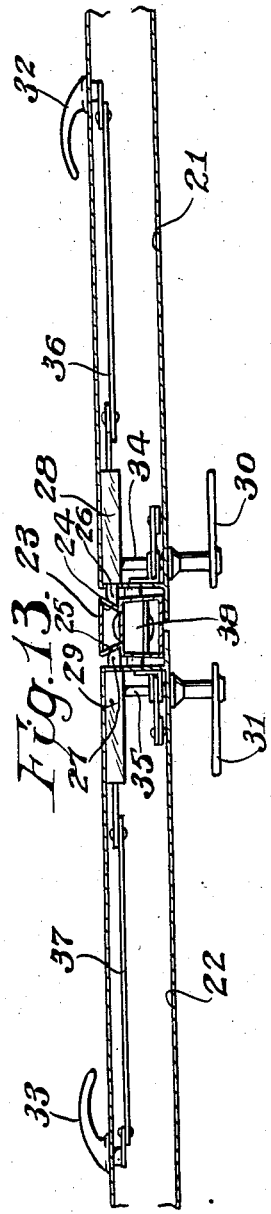
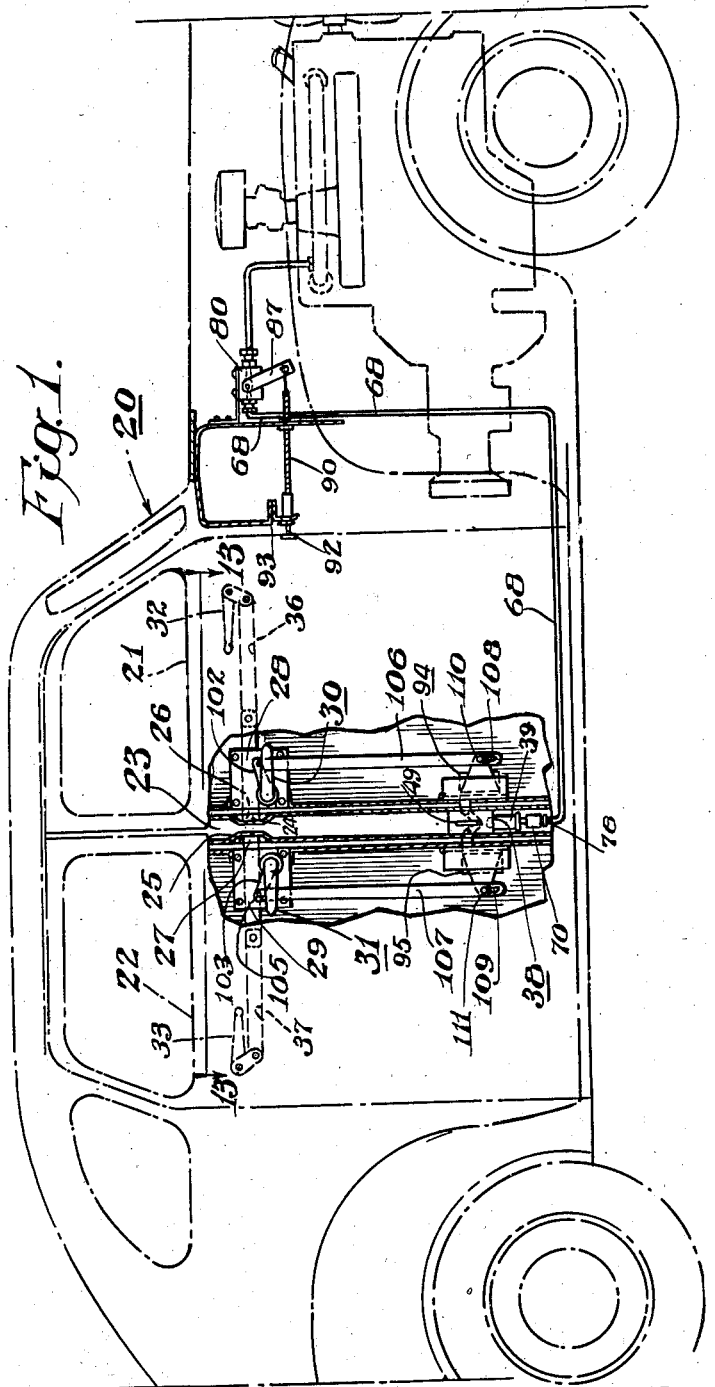

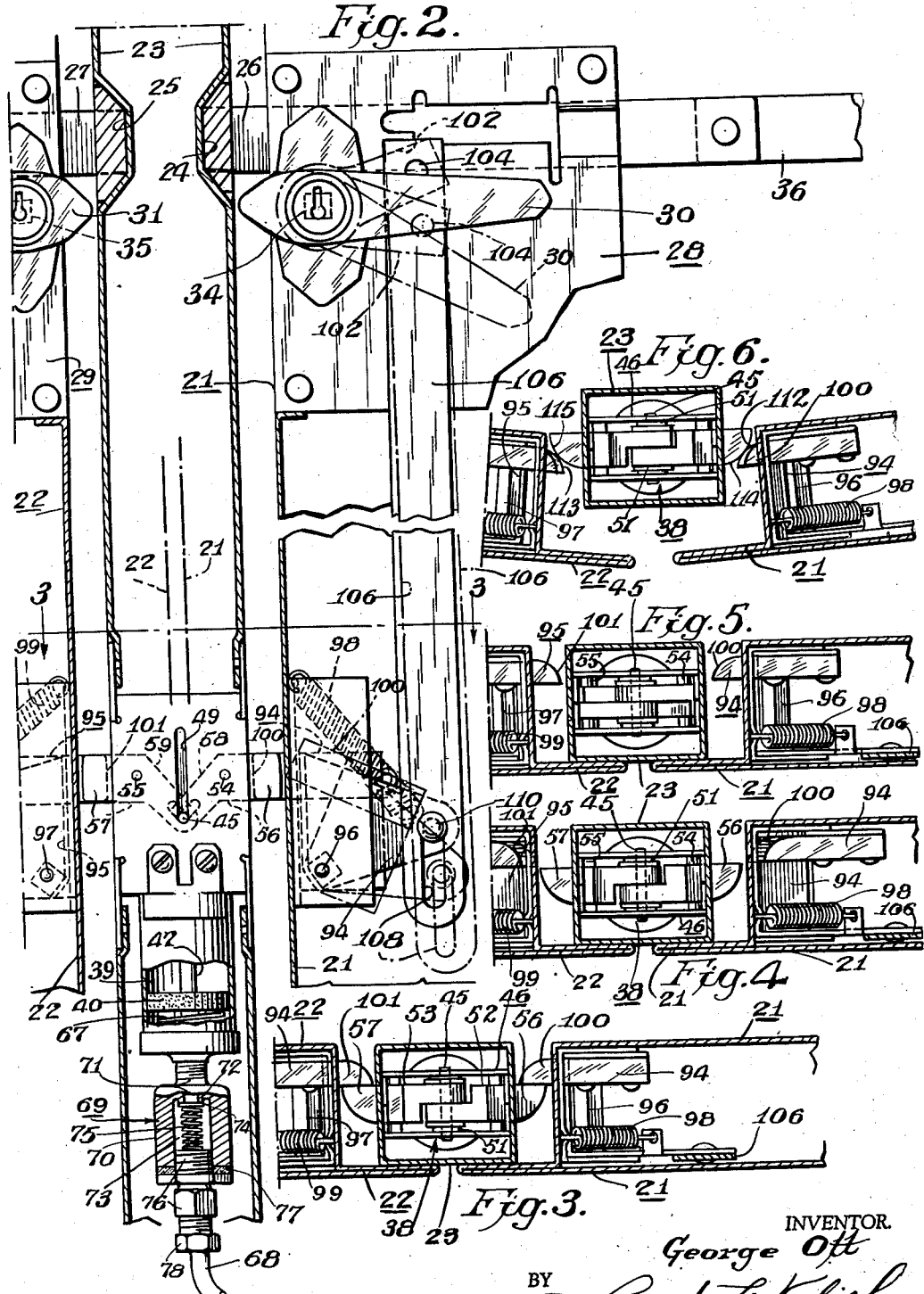

2,340,424

UNITED STATES PATENT OFFICE 2,340,424

AUTOMATIC SAFETY VACUUM LOCK

George Ott, Philadelphia, Pa.

Application February 16, 1942, Serial No. 431,064

3 Claims. (Cl. 180—82)

The present invention relates to a certain new and useful automatic locking device for doors and the like and it relates more particularly to an automatic device for locking the doors of an automobile.

An object of the present invention is to provide a simple, dependable and efficient auxiliary locking device for the doors of an automobile or the like. Another object of the present invention is to provide an automatic safety lock which will prevent the doors of an automobile from being opened while the automobile is in motion.

Still another object of the present invention is to provide an automatic auxiliary lock for the doors of an automobile which will prevent the doors of the automobile from being opened from the inside while the motor is running but which will permit the doors to be opened from the outside while the motor is running. An additional object of the present invention is to provide manually controllable vacuum-operated automatic auxiliary locking means which will prevent inadvertent or accidental opening of the doors of an automobile from the inside while the motor is running but which, at the same time, will permit the doors to be opened from the outside and to be closed.

Other objects, purposes and advantages are apparent in the following specification and claims and in the accompanying drawings.

In brief, the present invention comprises a safety lock for the doors of an automobile or the like including a unit door post or jamb and a co-operating unit disposed in the door of the automobile, said units having latches which, when both extended, overlap to prevent opening of the door. The unit disposed in the door post or jamb is controlled by running of the engine so that the latch thereof is in extended position when the engine is running and is retracted when the engine is stopped. The unit disposed in the door normally has its latch in extended position, the latch being adapted to be retracted upon turning of the outer door handle; the inner door handle being inoperative to retract said latch. The safety lock of the present invention also includes means permitting the door to be closed while the latch of the engine-operated unit is in extended position.

While safety locks for doors of automobiles have been known in the past, the safety locks of the prior art have had several disadvantages in that they lock the doors against opening from the outside as well as from the inside and, fur- thermore, do not permit closing of the door when the locking unit is in locking position. The prior-art devices, in locking the doors from the outside as well as from the inside, produce a grave hazard which may very well have fatal consequences should an accident occur. For example, should a car, employing an old-type lock (which locks both the outside door handles and the inside door handles) be involved in an accident after which the motor continues running, it would be impossible for would-be rescuers to reach the occupants of the car. For example, should a car be involved in a rear-end collision which ignites the fuel in the gas tank and overturns the car but which, at the same time, leaves the engine still running, the conventional safety locks would, by locking the outer door handles, prevent rescuers from getting to the unconscious occupants of the car. It can be seen that the additional time or facilities required to break into the car through the locked doors might very well result in fatalities which could have been prevented had the outer door handles not been so locked.

The novel safety lock of the present invention, on the other hand, while locking the inner door handles against inadvertent or accidental opening while the car is in operation, leaves the outer door handles operative, at all times, to open the doors and, thus, the present safety lock affords distinct and pronounced advantages over the prior-art constructions.

Another advantage possessed by the safety lock of the present invention is that the door can be closed should the engine be started while the door is open, in contradistinction to old-type locks which prevent the door from being closed after the engine has been started until either the motor is re-stopped or the locking unit is rendered inoperative.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a side elevational view of an automobile equipped with one embodiment of the safety lock of the present invention; parts being broken away better to reveal the construction thereof.

Figure 2 represents a side elevational view on an enlarged scale of the locking mechanisms shown in Figure 1.

Figure 3 represents a cross sectional view generally along the line 3—3 of Figure 2 showing the safety lock of the present invention as it appears when the motor is running and the doors are closed.

Figure 4 represents a view similar to that of Figure 3 but showing the lock as it appears when the outer door handles have been turned preliminary to opening the doors.

Figure 5 represents a view similar to those of Figures 3 and 4 but showing the lock as it appears after the motor has stopped but while the doors are closed.

Figure 6 represents a view similar to that of Figure 3 but showing the safety lock as it appears while the door is being closed with the motor running.

Figure 7 represents a vertical cross-sectional view of the vacuum-operated latch portion of the safety lock of the present invention as it appears when the motor has been stopped and the vacuum dissipated so that the latches are spring-pressed to their retracted position.

Figure 8 represents a side elevational view of the latch portion shown in Figure 7.

Figure 9 represents a cross-sectional view generally along the line 9—9 of Figure 7.

Figure 10 represents an elevational view of the suction-controlling valve mechanism showing the valve in closed position.

Figure 11 represents a cross-sectional view generally along the line 11—11 of Figure 10.

Figure 12 represents a cross-sectional view along the line 12—12 of Figure 11 but showing the valve in open position.

Figure 13 represents a cross-sectional view generally along the line 13—13 of Figure 1.

In Figures 1 to 13, I have shown one embodiment of my automatic auxiliary door lock installed on an automobile 20 having conventional oppositely-hinged front and rear doors 21 and 22 separated by a central door post or jamb 23 having front and rear locking recesses 24 and 25 with which the normally-outwardly-spring-pressed latches 26 and 27 of conventional front and rear door locks 28 and 29 are adapted to engage and dis-engage in conventional manner upon turning of the conventional front and rear door outer handles 30 and 31 or of the conventional front and rear door inner handles 32 and 33. As is conventional in automobile door locks, the outer and inner handles of the locks operate the latches independently of each other; the shafts 34 and 35 of the outer handles 30 and 31 keying directly into the locks 28 and 29, while the inner handles 32 and 33 are connected to the locks by conventional link arms 36 and 37, respectively.

While the drawings and the description refer only to the two doors on one side of the automobile, it is to be understood that the automobile 20 is a conventional four-door sedan type automobile, so that a pair of similar doors, together with all their related parts, is present on the other side of the automobile.

With the conventional door locks and inner and outer handles hereinabove described, it is apparent that the front and rear doors 21 and 22 can be opened by turning either the inner handles or the outer handles thereof. It is also apparent that, should the inner handles be turned accidentally or inadvertently, the doors will open even though the car is in motion. This represents a distinct hazard to the occupants of the automobile, particularly where the rear seat is occupied by children who, in play, are quite apt to lean against the inner door handles with sufficient force to turn them and to unlatch the doors. When this happens, the wind caused by the car's movement will jerk the rear doors open with a sudden and violent movement which may easily result in the occupants of the car being thrown out. Such sudden opening of the doors also may result in stripping of the doors from their hinges and, quite possibly, may cause the car to swerve, due to the sudden side drag, sufficiently to throw it off the road or to collide with another vehicle.

It should be noted that conventional means which are provided for locking the doors from the inside of the car, lock only the outside door handles, so that these conventional locking means do not prevent opening of the doors as the result of inadvertent or accidental turning of the inner handles.

Accordingly, I provide separate auxiliary locking means which prevent the doors from being opened even though the inner door handles are turned while the engine is running, but which, at the same time, permits the doors to be opened upon turning of the outer door handles and also permit the doors to be closed.

In the embodiment shown in Figures 1 to 13, I provide, within a lower portion of the door post 23 (below the regular locks 28 and 29), a vacuum-operated auxiliary locking unit which is designated generally by the reference character 38. The unit 38 includes a cylinder 39 in which a piston 40 is slidably disposed; the piston 40 being provided with a suitable gasket 41 of cup leather or the like which forms a fluid-tight seal against the wall of the cylinder 39.

A rod 42 is threaded at one end 43 thereof and is fastened to the piston 40 by a pair of nuts 44 disposed on opposite sides of said piston 40. The rod 42 extends upwardly beyond said piston 40 and is provided with a pair of spaced arms 50 at its upper end; a transversely-extending pin 45 passing through, and being supported by, said arms 50.

A frame 46 having a transverse dimension approximating that of the door post 23 and having a somewhat smaller depth than said post 23 is affixed to the top of the cylinder 39 by any conventional means, as for example the bolts 47. The frame 46 includes side plates 48 having vertical slots 49 therein; the projecting ends of the pin 45 being channelled within the slots 49. The slots 49 thus serve to support and center the pin 45 and the rod 42 during upward or downward movement thereof; a pair of washers 51 being disposed about the pin 45 intermediate the arms 50 and the plates 48 to reduce friction and play.

The pin 45 serves as the central hinge of a toggle joint which includes front and rear latches 52 and 53 pivoted upon pins 54 and 55 respectively; the pins 54 and 55 being carried between the side plates 48 of the frame 46. The latches 52 and 53 have conventional outer portions 56 and 57 respectively and also have inner portions 58 and 59 which are formed at an angle to the portions 56 and 57 and which contain slots 60 and 61 through which the pin 45 passes.

When the piston 40 and the pin 45 are in their uppermost positions, the toggle joint is in its retracted position in which the portions 56 and 57 extend downwardly from the pins 54 and 55 as shown in Figures 7 and 8 and in which the portions 58 and 59 extend upwardly at an angle from said pins 54 and 55. When, due to downward movement of the piston 40, the pin 45 moves downwardly within the slots 49, the toggle joint moves to its extended position in which the outer portions 56 and 57 of the latches 52 and 53 extend generally horizontally outward from the pins 54 and 55 in semaphore-fashion as shown in Figures 2, 3 and 6; the portions 58 and 59 extending downwardly at an angle from said pins 54 and 55.

When the portions 56 and 57 are in their extended position as shown in Figures 2, 3 and 6, they extend outwardly beyond the line of the door post 23 through openings 62 and 63 in front and rear end plates 64 and 65 of the frame 46. The front and rear end plates 64 and 65 of the frame 46 are generally flush with the sides of the door post 23 and are fastened therein by screws 66 which support the unit 38 within the post 23.

As shown particularly in Figures 3 and 6, the outer portions 56 and 57 of the latches 52 and 53 do not, when extended, prevent the closing of the doors 21 and 22 but extend for more than half the clearance between the post 23 and the doors 21 and 22.

The piston 40 is normally held in its uppermost position within the cylinder 39 by a coil spring 67.

Means are provided whereby the vacuum, created by the engine of the car when it is running, can be transmitted to the cylinder 39 to pull the piston 40 downwardly therein against the pressure of the spring 67; the upper end of the cylinder 39 being open to the atmosphere. This means may include a conduit 68 which may be connected at one end to the engine, as shown in Figure 1, preferably to the intake manifold of the engine. The conduit 68, at its other end, may be connected to the cylinder 39 so that the vacuum or suction created in the intake manifold, when the engine is running, can be transmitted to the cylinder 39.

Instead of connecting the conduit 68 directly to the cylinder 39, I prefer to provide a valve 69 intermediate the conduit 68 and the cylinder 39.

The valve 69 includes a housing 70 having an uppermost apertured reduced neck 71 which may be screw threadedly or otherwise affixed within an opening in the bottom of the cylinder 39. An annular valve seat 72 is provided at the upper end of the cylindrical bore 73 of the housing 70 and a flat valve 74 is normally pressed upward against, and seated upon, the valve seat 72 by a coil spring 75 disposed within the bore 73; said spring 75 being supported, at its lower end, upon a drilled nut 76 which is screw threadedly disposed within the lower end of the bore 73 and which forms a fluid-tight seal with said bore 73 through the compression gasket 77.

The conduit 68 is connected to the drilled nut 76 by means of a collar 78 which encircles the end of the conduit 68 and which is screw threadedly disposed within the lower end of said drilled nut 76. Thus, a direct vacuum line leads from the intake manifold of the engine through the conduit 68, the drilled nut 76, the bore 73 and the apertured neck 71, to the cylinder 39.

At any convenient point intermediate the ends of the conduit 68, I may provide means for shutting off the conduit so that the suction from the engine is no longer transmitted to the cylinder 39.

In Figures 10, 11 and 12 I have shown one form of cut-off for the conduit 68. The cut-off may include a housing 80 which has a drilled bore 81, to the ends of which the conduit is adapted to be connected. Thus, the bore 81 forms a part of the line of the conduit 68. A frusto-conical opening is provided transversely of the housing 80 and a correspondingly frusto-conical plug 82 is fitted within said opening so as to pass across the drilled bore 81. The plug 82 is provided with a bore 83 which may be brought into or out of registration with the bore 81 upon rotation of the plug 82. The plug 82 may protrude, at its smaller end, beyond the housing 80 and may have its protruding end 84 screw threaded to receive a nut 85 and a tension spring 86 which hold the plug within the housing 80.

At its larger end, the plug 82 may be provided with an arm 87 which, at its other end, is provided with a swivellably mounted apertured collar 88 having a set screw 89.

A flexible metal cable 90 having an outer flexible sheathing 91 has one end disposed within the collar 88 and fastened therein by the set screw 89. The other end of the cable 90 is connected to an operating handle 92 which may be connected at any suitable point, as for example, below the dash board 93.

The cable may be set so that, when the handle 92 is pushed in, the arm 87 is swung to rotate the plug 82 sufficiently to move the bore 83 out of registration with the bore 81 and thus to break the vacuum line between the intake manifold and the cylinder 39. When, on the other hand, the handle 92 is pulled out, the arm 87 is swung clock-wise to rotate the plug 82 sufficiently to bring the bore 83 into registration with the bore 81 and thus to re-establish the suction line between the intake manifold and the cylinder 39.

It is apparent that, when suction is transmitted to the cylinder 39, the piston 40 and the pin 45 are moved downward so that the portions 56 and 57 of the latches 52 and 53 are in their outwardly-extending positions. When, on the other hand, no suction is transmitted to the cylinder 39, either because the engine is stopped or because the valve plug 82 is turned to its closed position, the spring 67 will force the piston 40 and the pin 45 to their uppermost positions whereupon the portions 56 and 57 of the latches 52 and 53 assume their retracted positions.

Opposite and in line with the unit 38, a pair of latches 94 and 95 are provided at the free edges of the front and rear doors 21 and 22, respectively. The latches 94 and 95 are pivoted on pins 96 and 97 respectively and are normally held in upright position by coil springs 98 and 99. In the normal upright position of the latches 94 and 95, the portions 100 and 101 thereof protrude, through suitable openings, beyond the edge of the doors 21 and 22 more than half-way across the clearance between the doors 21 and 22 and the post 23 as shown in Figures 3 and 5.

The latches 94 and 95 are adapted to be rotated upon their pins 96 and 97 so as to retract the normally-protruding portions 100 and 101 thereof as shown in Figure 4. Means are provided for thus rotating the latches 94 and 95 to retract the portions 100 and 101 thereof, upon turning of the outer door handles 30 and 31. The said means include arms 102 and 103 which are adapted to be keyed to the shafts 34 and 35 of the front and rear outer handles 30 and 31. The free ends of the arms 102 and 103 are swivellably connected by pins 104 and 105 to downwardly-extending links 106 and 107. The slots 108 and 109 are provided at the lower ends of the links 106 and 107. Pins 110 and 111 carried by the latches 94 and 95 fit within the slots 108 and 109, respectively.

When the outer door handles 30 and 31 are in their closed position as shown in solid lines in Figure 2, the links 106 and 107 are also in their uppermost positions so as to permit upward movement of the pins 110 and 111 and to permit the latches 94 and 95 to be rotated by the springs 98 and 99 into the positions in which the portions 100 and 101 of the latches 94 and 95 protrude beyond the edge of the doors as shown in Figures 3 and 5. When, on the other hand, the door handles are turned downward into the position shown in dotted lines in Figure 2, in order to retract the latches 26 and 27 (to open the door) the links 106 and 107 are moved downward to force the pins 110 and 111 downward and to cause the latches 94 and 95 to rotate against the springs 98 and 99 so as to swing the portions 100 and 101 of the latches 94 and 95 into their retracted positions shown in Figure 4.

It should be noted that, since the inner door handles operate the latches 26 and 27 of the locks 28 and 29 independently of the outer handles, turning of the inner handles 32 and 33 will not move the links 106 and 107 and will not retract the portions 100 and 101 of the latches 94 and 95.

It can be seen that when the portions 56 and 57 of the latches 52 and 53 are in their extended position and when the portions 100 and 101 of the latches 94 and 95 are also in their extended position, they overlap as shown particularly in Figure 3 so that it is impossible to open the doors. That is, unless either the portions 56 and 57 or the portions 100 and 101 are retracted, neither the front door 21 nor the rear door 22 can be opened.

Thus, in effect, the latches 52 and 53 of the unit 38 and the latches 94 and 95 in the front and rear doors 21 and 22 act as auxiliary locks for the front and rear doors; these auxiliary locks keeping the doors shut regardless of whether the regulation front and rear door locks 28 and 29 are closed or open. It can be seen that the portions 56 and 57 will be retracted only when the vacuum is not transmitted to the cylinder 39 (either because the motor is stopped or because the shut-off valve in the conduit 68 is closed).

When the portions 56 and 57 are thus retracted, the auxiliary lock is inoperative, since the portions 100 and 101, even when extended, do not prevent opening of the doors when the portions 56 and 57 are retracted. When, on the other hand, the portions 56 and 57 are in their extended position, the front door 21 can be opened only by retracting the portion 100 and the rear door 22 can be opened only by retracting the portion 101. As previously described, turning of the outer door handles 30 and 31 will operate the arms 34 and 35 and the links 106 and 107 to swing the latches 94 and 95 to retract the portions 100 and 101 so that the doors can be opened from the outside at all times whether or not suction is being transmitted to the cylinder 39. However, as also previously described hereinabove, turning of the inner handles 32 and 33 does not affect the latches 94 and 95 so that, when the cylinder 39 is evacuated, and the portions 56 and 57 are extended, the doors 21 and 22 cannot be opened from the inside.

I also provide means which permit the doors, after having been opened with the motor running and with the portions 56 and 57 extended, to be closed without retracting the portions 56 and 57. As can be seen particularly in Figure 6, when the doors are open and when the portions 56 and 57 are extended, a closing of the doors will cause the camming surfaces 112 and 113 of the protruding portions 100 and 101 to slide over the camming surfaces 114 and 115 of the portions 56 and 57 and thus to swing the latches 94 and 95 upon their pins 96 and 97 against their springs 98 and 99 sufficiently to retract the portions 100 and 101 until they clear the portions 56 and 57 and allow the door to close, whereupon the latches 94 and 95 will be pulled back to their extended position by the springs 98 and 99. During such closing of the doors and rotation of the latches 94 and 95, the pins 104 and 105 of said latches 94 and 95 move downwardly within the slots 108 and 109 of the links 106 and 107 and also swing the links 106 and 107 slightly outwardly from their normally vertical position.

The operation of the safety lock of the present invention will now briefly be described.

As stated above, when the motor is not running, the auxiliary lock of the present invention is inoperative since the portions 56 and 57 are retracted. When the motor is started with the shut-off valve plug 82 in the closed position, the safety lock of the present invention still remains inoperative and the door handles will continue to be operable in the usual manner. When, however, the shut-off valve plug 82 is turned to the open position, suction from the intake manifold of the motor is transmitted through the conduit 68, the bore 83, the drilled nut 76, and the bore 73 to unseat the valve 74 and to permit the suction to be transmitted further through the apertured neck 71 and into the cylinder 39. The vacuum thus created in the cylinder 39 will pull the piston 40 downwardly therein against the spring 67 to operate the toggle joint and to move the portions 56 and 57 to their extended position to cause the safety lock of the present invention to become operative and to permit the front and rear doors 21 and 22 to be opened only by operation of the outer door handles 30 and 31 as described hereinabove; the inner handles 32 and 33 being no longer capable of opening said doors.

So long as suction is being transmitted through the conduit 68 to the cylinder 39, the portions 56 and 57 remain extended and the safety lock prevents opening of the doors by the inner handles.

The spring-pressed valve 74 prevents the safety lock of the present invention from becoming inoperative due to fluctuations in suction. It is well known that, during periods of sudden acceleration or load upon the engine, the suction created drops considerably. If means were not provided to counteract the effect of these drops in suction, the suction within the cylinder 39 might drop, during periods of rapid engine acceleration or maximum load, to a point at which the spring 67 would drive the piston 40 upward to retract the portions 56 and 57 and thus to render the safety lock inoperative while the car were moving. I, therefore, provide the spring-pressed valve 74 which acts as a check-valve at the lower end of the cylinder 39. That is, should the suction within the conduit 68 and the bore 73 drop so that it is less than the suction within the cylinder 39, the spring-pressed valve 74 will automatically close to seal off the lower end of the cylinder 39 and thus to retain sufficient suction within the said cylinder 39 to keep the piston 40 in its downward position so that the portions 56 and 57 remain extended and the safety lock remains operative.

While the safety lock of the present invention is in the upward position as above described with the portions 56 and 57 extending, turning of the inner door handles 32 and 33, while opening the conventional locks 28 and 29, will not open the safety lock so that the door handles remain closed. Thus, it is impossible for children or other occupants of the car to open the doors accidentally while the engine is running. However, as above described, turning of the front door outer handle 30 will not only open the conventional lock 28 but will also, through operation of the arm 102 and the link 106, rotate the latch 94 to retract the portion 100 thereof, thereby to permit opening of the front door 21. Similarly, turning of the rear door outer handle 31 will not only open the conventional lock 29 but will also, through operation of the arm 103 and the link 107, rotate the latch 95 to retract the portion 101 thereof, thereby to permit opening of the rear door 22.

Of course, the seal provided by the valve 74 is not absolutely fluid-tight and slow leakage of air across said valve 74 occurs to permit gradual dissipation of the vacuum in the cylinder 39 and retraction of the portions 56 and 57 when the suction is permanently cut off from the bore 73 either upon stopping of the engine or upon closing of the valve plug 82.

When the suction is thus permanently cut off from the bore 73, upon stopping of the engine or upon closing of the valve plug 82, the leakage of air across the valve 74 gradually reduces the suction within the cylinder 39 to a point at which the pressure of the spring 67 is sufficient to move the piston 40 upward and to retract the portions 56 and 57 so that the safety lock of the present invention is no longer operative to prevent opening of either door from the inside.

While the safety lock of the present invention is intended primarily for use in four-door sedan type automobiles, it may, of course, be used equally well in two-door sedan type automobiles to prevent accidental or inadvertent opening of the doors from the inside while the car is in motion. In this case, the vacuum-operated unit would be installed in the jamb of the front doors and, as is obvious, the latch 53 of the vacuum-operated unit would be superfluous and would be dispensed with.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what I hereby claim as new and desire to be secured by Letters Patent is:

1. A safety door lock for an automobile having a door equipped with an outer handle and an inner handle, said lock comprising engine-operated latch means disposed in the jamb of said door and having a latch normally spring-pressed to a retracted position within said jamb, said latch being movable to an extended position partially bridging the gap between the jamb and the door under the influence of engine-generated suction, latch means disposed within said door in juxtaposition to said first-mentioned engine-operated latch means and having a latch normally spring-pressed to an extended position partially bridging said gap and overlapping the extended latch of said first-mentioned latch means so as to prevent opening of said door when the engine is running and the engine-operated latch is extended, and means operable only by the outer door handle for retracting the latch of the second-mentioned latch means to permit opening of said door.

2. A safety door lock for an automobile or the like having a door equipped with an outer handle and an inner handle, said lock comprising juxtaposed latches in said door and in the jamb of said door, said latches when both extended being adapted to engage and thereby to lock said door, said door being free to open when either of said latches is retracted, the latch in said jamb being normally urged to its retracted position and the latch in said door being normally urged to its extended position, means operated by engine-created suction for extending the latch in said jamb, and means operable only by the outer door handle for retracting the latch in said door.

3. A safety door lock for an automobile or the like having a front door, a rear door and an intervening jamb post, each of said doors having an outer handle and an inner handle; said lock comprising engine-operated latch means disposed in said post and having a pair of oppositely-disposed latches normally spring-pressed to retracted position within said post, means operated by running of the engine for simultaneously moving said latches to extended position partially bridging the respective gaps between the post and the front and rear door, latch means disposed within the front door in juxtaposition to said engine-operated latch means and having a latch normally spring-pressed to an extended position partially bridging the gap between the front door and the post and overlapping the extended latch of the engine-operated latch means so as to prevent opening of said front door when the engine is running and the engine-operated latch is extended, means operable only by the front door outer handle for retracting the latch in said front door, latch means disposed within the rear door in juxtaposition to said engine-operated latch means and having a latch normally spring-pressed to an extended position partially bridging the gap between the rear door and the post and overlapping the extended latch of the engine-operated latch means so as to prevent opening of said rear door when the engine is running and the engine-operated latch is extended, and means operable only by the rear door outer handle for retracting the latch in said rear door.

GEORGE OTT.